June 16, 1931.  O. G. SIMMONS  1,809,868
GEAR SHAPED CUTTER AND METHOD OF MAKING SAME
Filed March 15, 1928    2 Sheets-Sheet 1
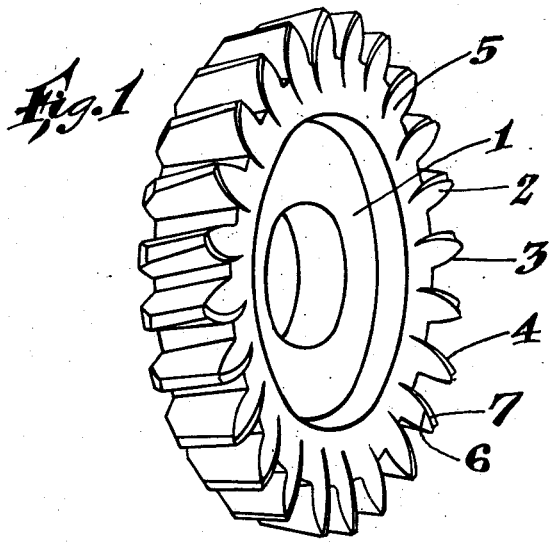
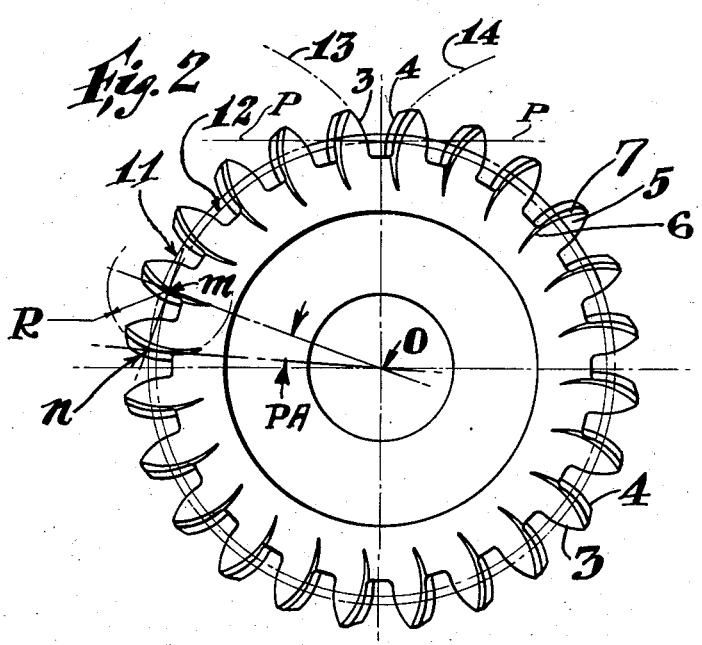
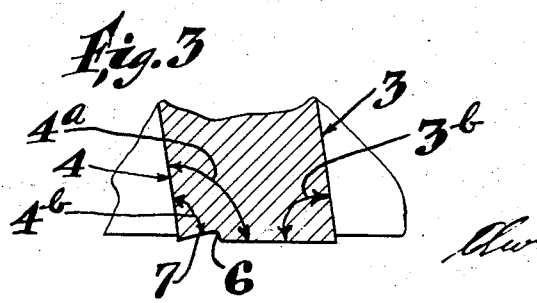
INVENTOR;

June 16, 1931.  O. G. SIMMONS  1,809,868
GEAR SHAPED CUTTER AND METHOD OF MAKING SAME
Filed March 15, 1928  2 Sheets-Sheet 2
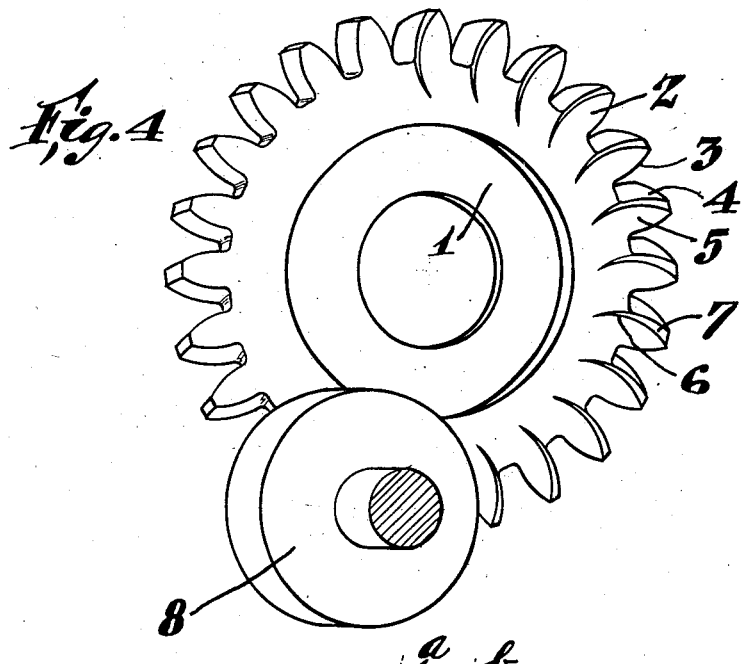
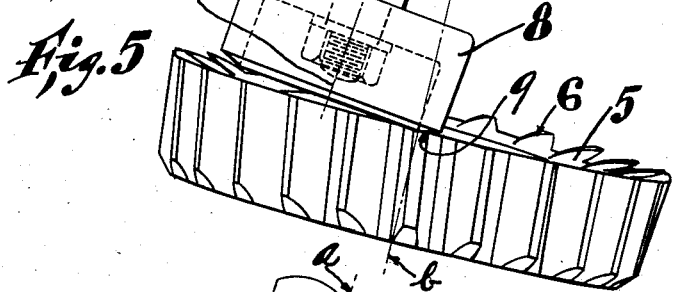
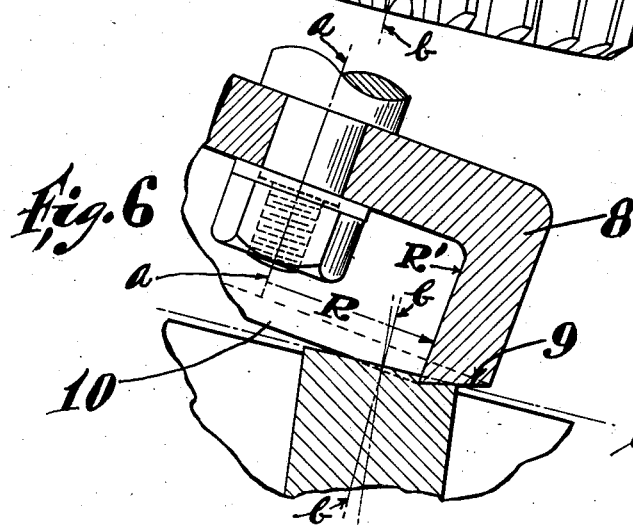
INVENTOR Patented June 16, 1931

1,809,868

UNITED STATES PATENT OFFICE

OLIVER G. SIMMONS, OF LAKEWOOD, OHIO

GEAR SHAPED CUTTER AND METHOD OF MAKING SAME

Application filed March 15, 1928. Serial No. 261,813.

This invention relates to gear shaped cutters and the method of forming the cutting edges thereof and particularly to helical gear shaped cutters such as used in gear shapers, thread generating machines and the like for cutting the teeth of helical gears, threads of worms, etc.

The present invention has for its object to provide a gear shaped cutter which has superior cutting action and which may be used for relatively long periods without resharpening and further, to provide a gear shaped cutter in which the cutting edges on opposite sides of each tooth are acute angled and are preferably equiangular with the surfaces which intersect to form the cutting edges disposed at substantially equal angles, one with respect to the other, along the opposite cutting edges of each tooth.

A further object of the invention is to provide a helical gear shaped cutter in which the cutting edges of each tooth are in substantially a surface of revolution.

A further object of the invention is to provide a helical gear shaped cutter in which the cutting edges of each tooth are in substantially a conical surface of revolution.

A further object is to provide a helical gear shaped cutter in which both involute cutting edges of each tooth have substantially the same form.

A further object of the invention is to provide a helical gear shaped cutter in which the involute surface of each tooth has true involute form in a plane perpendicular to the axis, said involute surfaces intersecting a surface of revolution to form an acute angled cutting edge on one side of each tooth and an obtuse angled cutting edge on the other side of each tooth, the obtuse angled cutting edge so formed being rectified by providing an additional surface of revolution to make each cutting edge on each side of the cutter acute and equiangular.

A further object of the invention is to provide a simple and economical method for forming and sharpening the cutting edges of the teeth of such a cutter.

With the above and other objects in view, the invention may be said to comprise the gear shaped cutter and method of making the same as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which:

Figure 1 is a perspective view of a gear shaped cutter embodying the invention.

Fig. 2 is a front elevation of the cutter.

Fig. 3 is a fragmentary sectional view taken transversely through the forward end of one of the teeth of the cutter.

Fig. 4 is a front elevation showing the milling cutter grooving the face of the gear shaped cutter to form equiangular cutting edges on one side of each tooth.

Fig. 5 is a plan view of the gear shaped cutter and milling cutter.

Fig. 6 is a horizontal section taken axially through the milling cutter and showing the engagement of the milling cutter with the face of the gear shaped cutter.

Referring to the accompanying drawings, the gear shaped cutter is indicated generally by the numeral 1 and this cutter is provided with teeth 2 which have the form of helical gear teeth with helicoid faces 3 and 4 which usually have the form of involute helicoids.

In order to provide the teeth with cutting rake, the front face 5 of the cutter 1 is preferably slightly re-entrant, this face is, therefore, preferably generated to conform to a conical surface of revolution coaxial with the cutter and inclined at a small angle with respect to planes perpendicular to the axis. This is conventional practice and to those skilled in this art it will be apparent that no rake is necessary when the helicoid teeth of the cutter are provided with helix angles greater than substantially 7°. In these cutters the front face 5 of the cutter 1 is preferably made to conform to a surface of revolution, a plane perpendicular to the axis of the cutter 1. If the teeth of the cutter are helically disposed, the surface of revolution 5 of the cutter will intersect one side of each tooth, indicated by the numeral 3 in the drawings, at an acute angle, indicated by the numeral 3b in Fig. 3, measured in a plane parallel with the axis and also at an acute angle measured in any radial plane of the face 5.

Consequently, this cutting edge at one side of each tooth is acute angled in any plane intersecting the cutting edge, as is desirable for efficient cutting action. The helicoid tooth face 4 on the opposite side of each tooth, however, intersects an end face at an obtuse angle, indicated by the numeral 4a in Fig. 3, in planes parallel with the axis, with the result that the last mentioned cutting edge would not operate as efficiently as the first and would soon become so blunt that the cutter would have to be resharpened.

It is the purpose of the present invention to provide the normally obtuse angle edge of the tooth with an acute angle cutting edge 4b substantially identical with the cutting edge at the opposite side of the tooth. This is accomplished in the present invention by generating along each normally obtuse tooth edge, an arcuate groove 6, one side of which is an inwardly inclined surface 7 of conical form which intersects the adjacent helicoid tooth face along a line substantially identical with the line of intersection of the helicoid face 3 with the end face 5 of the cutter.

The conical surfaces 7 are eccentrically disposed with respect to the cutter axis and intersect the helicoid faces 4 at acute angles, the angles of intersection being substantially the same as the corresponding angles of intersection along the cutting edge at the opposite side 3 of the tooth. The conical surfaces 7 may be generated by means of a crown abrasive wheel 8, which is positioned with its axis a—a offset from the axis b—b of the cutter 1 and disposed at an angle with respect thereto and which is provided with a conical cutting face 9 which has a taper such that the conical surface 7 generated by it on the face of the cutter tooth is inclined to the helicoid face 4 of the tooth 2 at substantially the same angle as that of the conical face 5 with the helicoid face 3 of the tooth. The face 10 of the abrasive wheel 8 is set at an angle to the face 5 of the cutter 1 sufficient to provide the necessary clearance and for a cutter of a given diameter having tooth faces of a known pressure angle, an abrasive wheel of the correct diameter and correct inclination of cutting face may be selected which will generate on the face of the gear shaped cutter, a conical surface 7 at the desired angle 4b to a helicoid face 4 of the tooth intersecting the helicoid face 4 along a line which will conform very closely to the original line of intersection of the helicoid face 4 with the face 5 of the cutter 1.

In Fig. 2 of the drawings, the pitch circle of the cutter is indicated at 11 and the base circle of the cutter is indicated at 12. The tooth faces 3 and 4 being involute helicoids, and in a plane perpendicular to the axis, the lines of intersection of the tooth faces with said plane will be involutes of the base circle 12, as indicated at 13 and 14 in Fig. 2.

The helical gear shaped cutter has tooth faces of involute form in planes perpendicular to the axis of the cutter. The face 5 may be inclined at a very small angle with respect to planes perpendicular to the axis, and if inclined, will intersect the tooth faces 3 and 4 along lines which do not vary sufficiently from the involute curves 13 and 14 to cause any material error in the operation of the cutter. If the error is greater than the allowable tolerance, it may be corrected by increasing the pressure angle of the involutes, as is well understood by those skilled in this art.

The right size abrasive wheel may be determined as follows:

In the right angle triangle $m$—$o$—$n$ Fig. 2, right angled at $m$, side $o$—$n$ is equal to the radius of the pitch circle 11, and side $o$—$m$ equal to the radius of the base circle 12, the angle $m$—$o$—$n$ being equal to the pressure angle. The radius R, therefore, struck from point $m$ on the base circle 12 equal to the length $m$—$n$, the side opposite the angle, will be substantially the correct radius of the inner circular surface R' of the abrasive wheel 8, see Fig. 6. This is easy to compute since $n$ is a point on the pitch circle and the point $o$ lies in the axis of the cutter.

The arcuate eccentrically disposed conical surfaces 7, intersect the helicoid faces 4 at acute angles and form cutting edges which are very nearly identical with the cutting edges on the opposite sides of the teeth and which also conform substantially to the involute curve of the teeth. Since both cutting edges of each tooth are substantially identical in form, they have substantially the same generating action with respect to conjugate teeth in the work piece and one side of the cutter teeth does not dull quicker than the other. Since both cutting edges of each tooth are formed by surfaces intersecting at acute angles, both sides of the teeth cut cleanly and have accurate generating action when used in a machine for cutting the teeth of helical gearing.

Furthermore, the acute angled cutting edges of involute form at both sides of the teeth insures a nearer approach to the theoretical generating action in the operation of the cutter and the cutter may be used for longer periods of time without resharpening.

What I claim is:

1. A gear shaped cutter having helical teeth which have generated helicoid side faces, said cutter having at one end spaced generated surfaces intersecting said helicoid faces to form cutting edges, the angle of intersection of said end surfaces with said helicoid faces, measured in any plane intersecting a cutting edge, being acute, all of said cutting edges lying substantially in a re-entrant conical surface of revolution coaxial with the cutter.

2. The herein described method of forming the cutting edges on teeth of a helical gear shaped cutter which comprises generating a re-entrant conical surface of revolution on an end face of the cutter coaxial with the cutter and intersecting one helicoid face of each tooth at acute angles and the remaining helicoid faces at obtuse angles, and generating, along each obtuse edge, a surface inclined at acute angles to the adjacent helicoid face.

3. The herein described method of forming the cutting edges on teeth of a helical gear shaped cutter which comprises generating a re-entrant conical surface of revolution on an end face of the cutter intersecting one helicoid face of each tooth at acute angles and the remaining helicoid faces at obtuse angles, and generating, along each obtuse edge, an arcuate conical surface intersecting the first mentioned conical surface along a line substantially coinciding with the intersection of the adjacent helicoid face therewith.

4. A gear shaped cutter having helical teeth which have helicoid side faces, said cutter having, at one end, a re-entrant conical face coaxial with the cutter and intersecting one side face of each tooth at acute angles, said end face having a portion along the edge of the opposite side face of each tooth cut back at acute angles to said side face.

5. A gear shaped cutter having helical teeth which have helicoid side faces, said cutter having, at one end, a re-entrant conical face intersecting one side face of each tooth at acute angles, said end face having arcuate grooves along the edges of the opposite faces of the teeth, each groove having a conical wall intersecting the adjacent helicoid face at acute angles.

6. A gear shaped cutter having an end face provided with spaced generated surfaces, each intersecting a side face of a tooth to form a cutting edge, said cutting edge lying substantially in a re-entrant conical surface of revolution coaxial with the cutter, said surfaces intersecting the side faces of the teeth to form cutting edges, the angles between the said surfaces and side faces, measured in any plane intersecting a cutting edge, being acute.

7. A gear shaped cutter having helically disposed teeth and an end face having a generated re-entrant conical surface which has a small angle of taper with respect to planes perpendicular to the axis and which intersects one side face of each tooth at acute angles, said end face having an arcuate conical surface along the opposite side face of each tooth which intersects the first mentioned conical surface along a line substantially coinciding with the line of intersection of the adjacent tooth face therewith and which is inclined at acute angles to said adjacent tooth face.

8. A gear shaped cutter having helically disposed teeth and an end face with respect to which one side of each tooth is disposed at an acute angle and also with respect to which face the opposite side of each tooth is disposed at an obtuse angle, the end face of each tooth having an arcuate groove extending along the obtuse edge thereof and having a conical wall intersecting the adjacent side face of the tooth at acute angles.

9. A gear shaped cutter having helical teeth which have generated helicoid side faces, said cutter having, at one end, spaced generated surfaces intersecting said helicoid side faces to form cutting edges, the angle of intersection of said spaced generated surfaces with said helicoid side faces, measured in any plane intersecting a cutting edge, being acute, all of said acute cutting edges lying substantially in a radial plane of revolution coaxial with the cutter.

10. A gear shaped cutter having helical teeth which have helicoid side cutting faces, one side of said cutter teeth having a cutting face lying in a plane perpendicular to the axis of the cutter and intersecting one helicoid side face of each tooth at an acute angle, the other side of said cutter teeth having a portion cut back from and along the cutting edge on substantially a reentrant conical surface of revolution at an acute angle to the helicoid side cutting face.

11. The herein described method of forming the cutting edges on teeth of a helical gear shaped cutter which comprises generating a reentrant conical surface of revolution on an end face of the cutter coaxial with the cutter and intersecting one helicoid side face of each tooth at acute angles and the remaining helicoid side faces at obtuse angles, and generating by means of a grinding wheel rotating in engagement with the end face of the cutter and on an axis lying in a plane substantially tangent to the base cylinder of the cutter, a surface along each obtuse edge inclined at acute angles to the adjacent helicoid face.

12. The herein described method of forming the cutting edges on teeth of a helical gear shaped cutter comprising generating a reentrant conical surface of revolution on an end face of the cutter and intersecting one helicoid side face of each tooth at acute angles and the remaining helicoid side faces at obtuse angles, and generating along each obtuse edge by means of a grinding wheel rotating in engagement with the cutter and on an axis lying in a plane substantially tangent to the base cylinder of the cutter an arcuate conical surface intersecting the first mentioned conical surface along a line substantially coinciding with the intersection of the adjacent helicoid face therewith.

In testimony whereof I affix my signature.
OLIVER G. SIMMONS.